(12) United States Patent
Samuels et al.

(10) Patent No.: US 8,101,267 B2
(45) Date of Patent: Jan. 24, 2012

(54) MULTILAYER POLYMERIC LAMINATES AND HIGH STRENGTH LAMINATES PRODUCED THEREFROM

(75) Inventors: Sam Louis Samuels, Landenberg, PA (US); Richard Allen Hayes, Beaumont, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 494 days.

(21) Appl. No.: 11/642,185

(22) Filed: Dec. 20, 2006

(65) Prior Publication Data

US 2007/0154694 A1 Jul. 5, 2007

Related U.S. Application Data

(60) Provisional application No. 60/755,336, filed on Dec. 30, 2005.

(51) Int. Cl.
*B32B 7/02* (2006.01)

(52) U.S. Cl. .............. 428/212; 428/220; 428/411.1; 428/424.6; 428/688

(58) Field of Classification Search .......... 428/212, 428/220, 411.1, 424.6, 688
See application file for complete search history.

(56) References Cited

U.S. PATENT DOCUMENTS

| | | | |
|---|---|---|---|
| 3,344,014 A | 9/1967 | Rees | |
| 3,762,988 A | 10/1973 | Clock et al. | |
| 4,082,877 A | 4/1978 | Shadle | |
| 4,104,216 A | 8/1978 | Clampitt | |
| 4,663,228 A | 5/1987 | Bolton et al. | |
| 4,668,574 A | 5/1987 | Bolton et al. | |
| 4,799,346 A | 1/1989 | Bolton et al. | |
| 5,002,820 A | 3/1991 | Bolton et al. | |
| 5,344,513 A | 9/1994 | Takenaka | |
| 5,476,553 A | 12/1995 | Hanoka et al. | |
| 5,478,402 A | 12/1995 | Hanoka | |
| 5,759,698 A | 6/1998 | Tanuma et al. | |
| 5,763,062 A | 6/1998 | Smith et al. | |
| 5,766,744 A | 6/1998 | Fanselow et al. | |
| 5,895,721 A | 4/1999 | Naoumenko et al. | |
| 6,114,046 A | 9/2000 | Hanoka | |
| 6,150,028 A | 11/2000 | Mazon | |
| 6,187,448 B1 | 2/2001 | Hanoka et al. | |
| 6,238,801 B1 | 5/2001 | Naoumenko et al. | |
| 6,265,054 B1 | 7/2001 | Bravet et al. | |
| 6,320,116 B1 | 11/2001 | Hanoka | |
| 6,353,042 B1 | 3/2002 | Hanoka et al. | |
| 6,432,522 B1 | 8/2002 | Friedman et al. | |
| 6,660,930 B1 | 12/2003 | Gonsiorawski | |
| 6,770,360 B2 | 8/2004 | Mientus et al. | |
| 2001/0008695 A1 | 7/2001 | Bolton et al. | |
| 2001/0046595 A1 | 11/2001 | Moran et al. | |
| 2002/0038664 A1 | 4/2002 | Zenko et al. | |
| 2002/0055006 A1 | 5/2002 | Vogel et al. | |
| 2002/0155302 A1 | 10/2002 | Smith et al. | |
| 2003/0000568 A1 | 1/2003 | Gonsiorawski | |
| 2003/0044579 A1 | 3/2003 | Bolton et al. | |
| 2003/0124296 A1 | 7/2003 | Smith | |
| 2005/0084697 A1 | 4/2005 | Smillie | |
| 2005/0106386 A1 | 5/2005 | Vogel et al. | |
| 2005/0136263 A1 | 6/2005 | Roberts et al. | |
| 2005/0279401 A1* | 12/2005 | Arhart et al. | ........... 136/251 |

FOREIGN PATENT DOCUMENTS

| | | |
|---|---|---|
| JP | 60-226435 A | 11/1985 |
| JP | 8-295541 A | 11/1996 |
| WO | WO 96/41717 | 12/1996 |
| WO | WO 99/58334 | 11/1999 |
| WO | WO 01/60604 A1 | 8/2001 |
| WO | WO 2004/011271 A1 | 2/2004 |
| WO | WO 2004/011755 A1 | 2/2004 |

OTHER PUBLICATIONS

PCT International Search Report and Written Opinion for International Application No. PCT/US2006/049312 dated May 22, 2007.
MATWEB material property data, Jul. 16, 2008.
DuPont Surlyn® ionomer resin Selector Guide (1996).
DuPont Surlyn® ionomer Resin Product Guide (1994).
DuPont Surlyn® Resins Properties Chart (2005).
DuPont™ SentryGlas® and Butacite® Interlayers in Laminated Glass—Technical Bulletin—Acoustical Performance (2009).
DuPont™ SentryGlas® Architectural Safety Glass Interlayer (2008).
ASTM D 638-03 (2003).
ASTM D882-01.

* cited by examiner

*Primary Examiner* — David Sample
*Assistant Examiner* — Lawrence Ferguson

(57) ABSTRACT

The present invention provides for certain multilayer polymeric laminates and high strength laminates produced therefrom. The multilayer polymeric laminates provide improved acoustic barrier properties of the high strength laminates of the present invention.

21 Claims, No Drawings

MULTILAYER POLYMERIC LAMINATES AND HIGH STRENGTH LAMINATES PRODUCED THEREFROM

CROSS REFERENCE TO RELATED APPLICATION

This application claims priority to U.S. provisional application Ser. No. 60/755,336, filed Dec. 30, 2005, the entire disclosure of which is incorporated herein by reference.

FIELD OF THE INVENTION

This invention relates to multilayer polymeric laminates and high strength laminates produced therefrom that have improved acoustic barrier properties.

BACKGROUND OF THE INVENTION

Glass laminated products for safety glass applications is characterized by high impact and penetration resistance, and does not scatter glass shards and debris when shattered. Glass laminates typically consists of a sandwich of two glass sheets or panels bonded together with an interlayer of a polymeric film or sheet, which is placed between the two glass sheets. One or both of the glass sheets may be replaced with optically clear rigid polymeric sheets, such as sheets of polycarbonate materials. Safety glass has further evolved to include multiple layers of glass sheets (or optically clear rigid polymeric sheets that are used in place of the glass) bonded together with interlayers of polymeric films or sheets.

The interlayer is typically made with a relatively thick polymer film or sheet, which exhibits toughness and bondability to provide adhesion to the glass in the event of a crack or crash. Over the years, a wide variety of polymeric interlayers have been developed to produce laminated products. In general, these polymeric interlayers must possess a combination of characteristics including very high optical clarity (low haze), high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, excellent long term weatherability, among other requirements. Widely used interlayer materials utilized currently include complex, multicomponent compositions based on polyvinylbutyral (PVB), polyurethane (PU), polyvinylchloride (PVC), linear low density polyethylenes (preferably metallocene-catalyzed), ethylene vinyl acetate (EVAc), polymeric fatty acid polyamides, polyester resins, such as poly(ethylene terephthalate), silicone elastomers, epoxy resins, elastomeric polycarbonates, and the like.

A more recent trend has been the use of glass laminated products in the construction business for homes and office structures. The use of architectural glass has expanded rapidly over the years as designers incorporated more glass surfaces into buildings. Threat resistance has become an ever increasing requirement for architectural glass laminated products. These newer products are designed to resist both natural and man made disasters. Examples of these needs include the recent developments of hurricane resistant glass, now mandated in hurricane susceptible areas, theft resistant glazings, and the more recent blast resistant glass laminated products designed to protect buildings and their occupants. These products have great enough strength to resist intrusion even after the glass laminate has been broken, i.e., when a glass laminate is subjected to high force winds and impacts of flying debris as occur in a hurricane or where there are repeated impacts on a window by a criminal attempting to break into a vehicle or structure.

In addition, glass laminated products have now reached the strength requirements for being incorporated as structural elements within buildings. An example of this would be glass staircases now being featured in many buildings.

A part of this trend has been the use of copolyethylene ionomer resins as the glass laminate interlayer material. Such ionomer resins offer significantly higher strength then found for the other common interlayer materials, such as polyvinyl butyral and ethylene vinyl acetate materials. See, e.g., U.S. Pat. Nos. 3,344,014, 4,663,228, 4,668,574, 4,799,346, 5,002,820, 5,763,062, WO 99/58334 and WO 2004/011755.

Multilayer laminate constructions which include certain ionomeric materials have been disclosed within the art. Clock et al., U.S. Pat. No. 3,762,988, disclose a glass laminate multilayer interlayer which may include poly(ethylene-co-methacrylic acid) materials that have been neutralized with metal ions or amines as the core layer and a load distribution layer. Friedman et al., U.S. Pat. No. 6,432,522, disclose optically transparent glazings which include an interlayer film comprising at least two polymeric film layers; a core layer having a modulus of at least 25,000 psi, which may be an ionomeric material, and a surface film layer having a maximum modulus of 15,000 psi. Vogel et al., US 2002/0055006 and US 2005/0106386, disclose a multilayer film or sheet comprising: a) a first co-extruded polymeric layer consisting essentially of ionomer, and b) at least one co-extruded second polymeric layer selected from the group consisting of ionomer, ionomer-polyethylene blend and ionomer-polyamide blend.

Roberts et al., US 2005/0136263, discloses a flexible window comprising a transparent multilayer sheet comprising: a transparent flexible base layer formed of a substantially plasticizer free polymeric material which may include ionomers, and a first transparent flexible protective layer having a greater abrasion resistance than the transparent flexible base layer, said transparent multilayer sheet being sufficiently flexible to allow rolling it into a cylindrical shape without cracking or fracturing. Durbin et al., WO 01/60604, disclose a laminated glazing which includes a transparent flexible plastic which reflects infra-red radiation bonded between a ply of ionomer resin and a ply of a polymer material which has a higher viscosity than the ionomer layer.

Society continues to demand more functionality from laminated glass products beyond the safety and strength characteristics described above. One area of need is for the glass laminate to function as an acoustic barrier to reduce the level of noise intrusion into the structure that the glass laminate is attached to, such as a building or an automobile. Acoustic laminated glass is generally known within the art and generally is disclosed to include a low modulus, heavily plasticized poly(vinyl acetal) sheet, which suffers the shortcomings of providing laminates with a low penetration resistance. Acoustic laminate disclosures include, for example, U.S. Pat. Nos. 5,190,826, 5,340,654, 5,368,917, 5,464,659, 5,478,615, 5,773,102, 6,074,732, 6,119,807, 6,132,882, 6,432,522, 6,825,255, WO 01/19747 and WO 2004/039581.

SUMMARY OF THE INVENTION

In one aspect, the present invention provides a multilayer polymeric laminate comprising three layers of ionomeric materials laminated such that the two outer layers are on either side of the inner layer, wherein the inner layer of ionomeric material has a modulus of from about 1,000 psi (7

MPa) to about 15,000 psi (103 MPa), preferably from about 3,000 psi (21 MPa) to about 10,000 psi (69 MPa), and wherein each of the layers of ionomeric materials has a thickness of at least about 1 mil (0.025 mm) or greater and the total thickness of the multilayer polymeric laminate is at least about 20 mil (0.5 mm) or greater. Each of the ionomeric materials independently comprise a copolymer of an alpha olefin and an alpha, beta-ethylenically unsaturated carboxylic acid partially neutralized with metal ions.

In the preferred embodiment of the multilayer polymeric laminate, the two outer layers of ionomeric materials each has a modulus of from about 16,000 psi (110 MPa) to about 100,000 psi (690 MPa), preferably from about 30,000 psi (207 MPa) to about 80,000 psi (552 MPa), and more preferably from about 50,000 psi (345 MPa) to about 75,000 psi (517 MPa).

In another embodiment of the multilayer polymeric laminate, the two outer layers of ionomeric materials each has a modulus of from about 1,000 psi (7 MPa) to about 15,000 psi (103 MPa), preferably from about 3,000 psi (21 MPa) to about 10,000 psi (69 MPa).

In another aspect, the present invention provides a high strength laminate comprising two rigid sheets and a multilayer polymeric laminate comprising three layers of ionomeric materials laminated such that the two outer layers of the multilayer polymeric laminate are on either side of the inner layer, wherein the inner layer of ionomeric material has a modulus of from about 1,000 psi (7 MPa) to about 15,000 psi (103 MPa), preferably from about 3,000 psi (21 MPa) to about 10,000 psi (69 MPa), wherein each of the layers of ionomeric materials has a thickness of at least about 1 mil (0.025 cm) or greater and the total thickness of the multilayer polymeric laminate is at least about 20 mil (0.5 mm) or greater, and wherein the two rigid sheets are positioned on opposite sides of the multilayer polymeric laminate. Preferably, the rigid sheets are glass.

In the preferred embodiment of the high strength laminate, the two outer layers of ionomeric materials each has a modulus of from about 16,000 psi (110 MPa) to about 100,000 psi (690 MPa), preferably from about 30,000 psi (207 MPa) to about 80,000 psi (552 MPa), and more preferably from about 50,000 psi (345 MPa) to about 75,000 psi (517 MPa).

In another embodiment of the high strength laminate, the two outer layers of ionomeric materials each has a modulus of from about 1,000 psi (7 MPa) to about 15,000 psi (103 MPa), preferably from about 3,000 psi (21 MPa) to about 10,000 psi (69 MPa).

The multilayer laminates of the present invention provide high strength laminates that maintain the high clarity and great penetration resistance commonly considered necessary for safety glass and provide improved acoustic barrier properties.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

All reference to modulus is to modulus measurements in accordance with ASTM D 638-03 (2003).

The multilayer polymeric laminate of the present invention comprises three layers of ionomeric materials laminated such that the two outer layers are on either side of the inner layer. The inner layer is a "soft layer" of ionomeric material having a modulus of from about 1,000 psi (7 MPa) to about 15,000 psi (103 MPa), preferably from about 3,000 psi (21 MPa) to about 10,000 psi (69 MPa), and a thickness of about 1 mil or greater. Preferably, the thickness of the inner layer is 20 mils (0.5 mm) or greater.

In the most preferred embodiment, the two outer layers are "stiff layers" of ionomeric materials with each having a modulus of from about 16,000 psi (110 MPa) to about 100,000 psi (690 MPa), preferably from about 30,000 psi (207 MPa) to about 80,000 psi (552 MPa), and more preferably from about 50,000 psi (345 MPa) to about 75,000 psi (517 MPa), and a thickness of about 1 mil (0.025 mm) or greater. The ionomeric materials of the two outer layers may be the same or different. This embodiment of the multilayer polymeric laminate comprises a "stiff layer-soft layer-stiff layer" architecture.

In another embodiment, the two outer layers are "soft layers" of ionomeric materials with each having a moduli of from about 1,000 psi (7 MPa) to about 15,000 psi (103 MPa), preferably from about 3,000 psi (21 MPa) to about 10,000 psi (69 MPa), and a thickness of about 1 mil (0.025 mm) or greater. The ionomeric materials of the two outer layers may be the same or different and may be the same or different from the ionomeric material of the inner layer. This embodiment of the multilayer polymeric laminate comprises a "soft layer-soft layer-soft layer" architecture.

The thickness of the multilayer polymeric laminate is about 20 mils (0.5 mm) or greater, preferably about 30 mils (0.75 mm) or greater and even more preferably about 60 mils (1.5 mm) or greater, based on the enhanced penetration strengths of the thicker laminates. Enhanced penetration strength is necessary within the present invention to satisfy many of the current mandated requirements for hurricane and threat resistance end uses. Many end uses require the multilayer polymeric laminate interlayer to be even thicker. Interlayers thicker than 60 mils (1.50 mm), 90 mils (2.25 mm), and even thicker than 120 mils (3.00 mm), are becoming commonplace within the marketplace.

In a preferred embodiment, the total thickness of the multilayer polymeric laminate is from about 20 mils (0.5 mm) to about 500 mils (12.7 mm), preferably from about 30 mils (0.75 mm) to about 250 mils, (6.4 mm), and more preferably from about 60 mils, (1.5 mm) to about 120 mils, (3.0 mm).

Preferably, the multilayer polymeric laminate has a light transmittance of 75 percent or greater.

The multilayer polymeric laminate of the present invention with the "stiff layer-soft layer-stiff layer" architecture further comprises one or more pairs of layers of ionomeric materials. Each pair has one layer of ionomeric material that has a modulus of from about 16,000 psi (110 MPa) to about 100,000 psi (690 MPa), preferably from about 30,000 psi (207 MPa) to about 80,000 psi (552 MPa), and more preferably from about 50,000 psi (345 MPa) to about 75,000 psi (517 MPa), and a thickness of about 1 mil (0.025 mm) or greater. The other layer of ionomeric material has a modulus of from about 1,000 psi (7 MPa) to about 15,000 psi (103 MPa), preferably from about 3,000 psi (21 MPa) to about 10,000 psi (69 MPa), and a thickness of about 1 mil or greater. Preferably, the thickness of this layer is 20 mils (0.5 mm) or greater. The outer layers of the resulting multilayer polymeric laminates are always "stiff layers" so that for a 5 layer laminate the additional pair of layers would provide a "stiff layer-soft layer-stiff layer-soft layer-stiff layer" architecture.

The multilayer polymeric laminate of the present invention with the "soft layer-soft layer-soft layer" architecture further comprises one or more layers of ionomeric materials. Each layer of ionomeric material has a modulus of from about 1,000 psi (7 MPa) to about 15,000 psi (103 MPa), preferably from about 3,000 psi (21 MPa) to about 10,000 psi (69 MPa), and a thickness of about 1 mil (0.025 mm) or greater.

Each of the ionomeric materials of the present invention independently comprise a copolymer of an alpha olefin and an alpha, beta-ethylenically unsaturated carboxylic acid partially neutralized with metal ions. Each of the copolymers of an alpha olefin and an alpha, beta-ethylenically unsaturated carboxylic acid independently incorporate from about 0.1 to about 30 weight percent of the alpha, beta-ethylenically unsaturated carboxylic acid component. Preferably, each of the copolymers of an alpha olefin and an alpha, beta-ethylenically unsaturated carboxylic acid independently incorporate from about 10 to about 25 weight percent of the alpha, beta-ethylenically unsaturated carboxylic acid component. More preferably, each of the copolymers of an alpha olefin and an alpha, beta-ethylenically unsaturated carboxylic acid independently incorporate from about 15 to about 25 weight percent of the alpha, beta-ethylenically unsaturated carboxylic acid component. The alpha olefin incorporates from 2 to 10 carbon atoms. Preferably, the alpha olefin may be selected from the group consisting of ethylene, propylene, 1-butene, 1-pentene, 1-hexene, 1-heptene, 3-methyl-1-butene, 4-methyl-1-pentene, and the like and mixtures thereof. More preferably, the alpha olefin is ethylene. Preferably, the alpha, beta-ethylenically unsaturated carboxylic acid component may be selected from the group consisting of acrylic acid, methacrylic acid, itaconic acid, maleic acid, maleic anhydride, fumaric acid, monomethyl maleic acid, and mixtures thereof. More preferably, the alpha, beta-ethylenically unsaturated carboxylic acid component may be selected from the group consisting of acrylic acid, methacrylic acid, and mixtures thereof.

The ionomeric materials may optionally contain other unsaturated comonomers. Other unsaturated comonomers may be selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimenthyl fumarate, vinyl acetate, vinyl propionate and mixtures thereof. Preferably, the other unsaturated comonomers are selected from the group consisting of methyl acrylate, methyl methacrylate, ethyl acrylate, ethyl methacrylate, butyl acrylate, butyl methacrylate, iso-butyl acrylate, iso-butyl methacrylate, glycidyl methacrylate, vinyl acetate and mixtures thereof. The level of the other unsaturated comonomer may be adjusted to provide an ionomeric material with the desired modulus. Preferably, the ethylene copolymers of the present invention incorporate between 0 and about 50 weight percent of the other unsaturated comonomer, based on the total weight of the composition. More preferably, the ethylene copolymers of the present invention incorporate between 0 and about 25 weight percent of the other unsaturated comonomer, based on the total weight of the composition. Most preferably, the ethylene copolymers of the present invention incorporate between 0 weight percent and about 10 weight percent of the other unsaturated comonomer, based on the total weight of the composition. The ethylene copolymers of the present invention may be polymerized as disclosed, for example, in U.S. Pat. Nos. 3,264,272, 3,355,319, 3,404,134, 3,520,861, 4,248,990, 5,028,674, 5,057,593, 5,827,559, 6,500,888 and 6,518,365.

The ionomeric materials are independently neutralized from about 5 to about 100 percent with metallic ions based on the total carboxylic acid content. The metallic ions may be monovalent, divalent, trivalent, multivalent or a mixture thereof. Preferable monovalent metallic ions are selected from the group consisting of sodium, potassium, lithium, silver, mercury, copper and mixtures thereof. Preferable divalent metallic ions are selected from the group consisting of beryllium, magnesium, calcium, strontium, barium, copper, cadmium, mercury, tin, lead, iron, cobalt, nickel, zinc and mixtures thereof. Preferable trivalent metallic ions are selected from the group consisting of aluminum, scandium, iron, yttrium and mixtures thereof. Preferable multivalent metallic ions are selected from the group consisting of titanium, zirconium, hafnium, vanadium, tantalum, tungsten, chromium, cerium, iron and mixtures thereof. Preferably, when the metallic ion is multivalent, complexing agents, such as stearate, oleate, salicylate, and phenolate radicals are included, as disclosed in U.S. Pat. No. 3,404,134. More preferably, the metallic ions are selected from the group consisting of sodium, lithium, magnesium, zinc, aluminum, and mixtures thereof. Most preferably, the metallic ions are selected from the group consisting of sodium, zinc, and mixtures thereof. Sodium ions are preferred as a result of the high optical clarity they provide. Zinc ions are most preferred as a result of the high moisture resistance they provide. Preferably, the ionomeric materials are independently neutralized from about 10 to about 90 percent with metallic ions based on the total carboxylic acid content. More preferably, the ionomeric materials are independently neutralized from about 15 to 50 percent with metallic ions based on the total carboxylic acid content. The ionomeric materials of the present invention may be neutralized as disclosed, for example, in U.S. Pat. Nos. 3,404,134, 4,666,988, 4,774,290, and 4,847,164.

The compositions of the present invention may be used with additives known within the art. Additives include plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, and primers. Typical colorants include a bluing agent to reduce yellowing, a colorant to color the laminate and a colorant to control solar light, such as an inorganic or organic infrared absorber.

The compositions of the present invention may incorporate 5 weight percent or less, preferably 1 weight percent or less, of pigments based on the total weight of the layer composition to provide high clarity and low haze. The pigments should be transparent pigments to provide low haze. Generally, transparent pigments are nanoparticles. The pigment nanoparticles preferably have a nominal particle size of less than about 200 nm, more preferably less than about 100 nm, even more preferably less than about 50 nm and most preferably within the range of about 1 nm to about 20 nm. A preferred method for forming pigment concentrate compositions usable within the present invention is disclosed within, for example, WO 01/00404.

The haze of the multilayer polymeric laminates and the high strength laminates of the present invention should be 5 percent or less and preferably 2.5 percent or less.

If higher levels of adhesion are desired within the laminates of the present invention, silane coupling agents may be incorporated into the layers. Typically, silane coupling agents are added at a level of about 0.01 to about 5 weight percent based on the total weight of the composition.

The compositions of the present invention may incorporate an effective amount of a thermal stabilizer. Any thermal stabilizer known within the art will find utility within the present invention. The compositions of the present invention preferably incorporate from 0 to about 10.0 weight percent, more preferably from 0 to about 5.0 weight percent thermal stabilizers and most preferably from 0 to about 1.0 weight percent thermal stabilizers, based on the total weight of the composition.

The compositions of the present invention may incorporate an effective amount of UV absorbers. Any UV absorber known within the art will find utility within the present invention. The compositions of the present invention preferably incorporate from 0 to about 10.0 weight percent, more preferably from 0 to about 5.0 weight percent, and most preferably from 0 to about 1.0 weight percent UV absorbers, based on the total weight of the composition.

The compositions of the present invention may incorporate an effective amount of hindered amine light stabilizers, (HALS). Any hindered amine light stabilizer known within the art may find utility within the present invention. Generally, HALS are secondary, tertiary, acetylated, N-hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function. The compositions of the present invention preferably incorporate from 0 to about 10.0 weight percent, more preferably from 0 to about 5.0 weight percent and most preferably from 0 to about 1.0 weight percent hindered amine light stabilizers, based on the total weight of the composition.

The compositions of the present invention may further incorporate additives that effectively reduce the melt flow of the resin, to the limit of producing thermoset layers. The use of such additives will enhance the upper end use temperature of the multilayer polymeric laminate and the high strength laminate of the present invention. Typically, the end use temperature will be enhanced 20° C. to 70° C. In addition, laminates produced from such materials will be fire resistant. By reducing the melt flow of the compositions of the multilayer polymeric laminate, these compositions have a reduced tendency to melt and flow out of the laminate and, in turn, serve as additional fuel for a fire. Examples of melt flow reducing additives are organic peroxides. Preferably the organic peroxide decomposes at a temperature of about 100° C. or higher to generate radicals. More preferably, the organic peroxides have a decomposition temperature which affords a half life of 10 hours at about 70° C. or higher to provide improved stability for blending operations. Typically, the organic peroxides will be added at a level of between about 0.01 to about 10 weight percent based on the total weight of the ethylene copolymer composition. If desired, initiators, such as dibutyltin dilaurate, may be used. Typically, initiators are added at a level of from about 0.01 weight percent to about 0.05 weight percent based on the total weight of the ethylene copolymer composition. If desired, inhibitors, such as hydroquinone, hydroquinone monomethyl ether, p-benzoquinone, and methylhydroquinone, may be added for the purpose of enhancing control to the reaction and stability. Typically, the inhibitors would be added at a level of less than about 5 weight percent based on the total weight of the composition.

The multilayer polymeric laminates may be formed through lamination, coextrusion, calendering, injection molding, blown film, dipcoating, solution coating, solution casting, blade, puddle, air-knife, printing, Dahlgren, gravure, powder coating, spraying, and other art processes. The parameters for each of these processes can be easily determined by one of ordinary skill in the art depending upon viscosity characteristics of the polymeric materials and the desired thickness of the layers of the laminate. Preferably, the multilayer polymeric laminates are produced through coextrusion processes or lamination processes.

The lamination process to produce the multilayer polymeric laminates generally involves forming a pre-press assembly, i.e., stacking the preformed layers in the desired order, followed by lamination. Any lamination process or combination of processes may be utilized, such as, for example, adhesive and/or tie layer lamination, solvent lamination, heat lamination and combinations thereof. Preferably, the preformed layers incorporate rough surfaces to facilitate the deairing during lamination processes.

More preferably, the multilayer polymeric laminates are formed through coextrusion processes. This provides a more efficient process by avoiding of the formation of a pre-press assembly and through reduced vacuum requirements during the lamination process. Coextrusion is particularly preferred for formation of "endless" products, such as sheets, which emerge as a continuous length. In coextrusion, generally each layer composition is provided from an individual extruder. If two or more of the layer compositions to be incorporated within the multilayer polymeric laminate are identical, they may be fed from the same extruder or from individual extruders, as desired. For each layer composition, the polymeric material, whether provided as a molten polymer or as plastic pellets or granules, is fluidized and homogenized. Additives, as described above, may be added, if desired. Preferably, the melt processing temperature of the polymeric compositions of the present invention is from about 50° C. to about 300° C., more preferably, from about 100° C. to about 250° C. The polymeric compositions of the present invention have excellent thermal stability, which allows for processing at high enough temperatures to reduce the effective melt viscosity. Recycled polymeric compositions may be used along with the virgin polymeric compositions. The molten materials are conveyed to a coextrusion adapter that combines the molten materials to form a multilayer coextruded structure. The layered polymeric material is transferred through an extrusion die opened to a predetermined gap. Die openings may be within a wide range. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as sheets and strips (slot dies) and hollow and solid sections (circular dies). Generally, a slot die, (T-shaped or "coat hanger" die), is utilized to produce multilayer sheets. The die may be as wide as 10 feet and typically have thick wall sections on the final lands to minimize deflection of the lips from internal pressure.

The multilayer polymeric laminate sheets are then drawn down to the intended gauge thickness by means of a primary chill or casting roll maintained at typically in the range of about 15° C. to about 55° C. The nascent multilayer cast sheet may be drawn down, and thinned significantly, depending on the speed of the rolls taking up the sheet. Typical draw down ratios range from about 1:1 to about 5:1 to about 40:1. The multilayer polymeric laminate sheet is then taken up on rollers or as flat sheets, cooled and solidified. This may be accomplished by passing the sheet through a water bath or over two or more chrome-plated chill rolls that have been cored for water cooling. The cast multilayer polymeric laminate sheet is then conveyed though nip rolls, a slitter to trim the edges, and then wound up or cut and stacked while preventing any subsequent deformation of the sheet.

The multilayer polymeric laminate of the present invention may have a smooth surface. If the multilayer polymeric laminate is to be used as an interlayer within a laminate, e.g., a high strength laminate, it preferably has a roughened surface to effectively allow most of the air to be removed from between the surfaces of the laminate during the lamination process. This may be accomplished, for example, by mechanically embossing the sheet after extrusion, as described above, or by melt fracture during extrusion.

The present invention also provides high strength laminates comprising a multilayer polymeric laminate of the present invention and two rigid sheets. The multilayer polymeric laminates of the present invention provide benefits to high strength laminates produced therefrom over single layer sheets of the art or over multilayer polymeric laminates of different architecture.

The rigid sheet may be glass or rigid transparent plastic sheets, such as, for example, polycarbonate, acrylics, polyacrylate, cyclic polyolefins, such as ethylene norbornene polymers, metallocene-catalyzed polystyrene and the like and combinations thereof. Metal or ceramic plates may be substituted for the rigid polymeric sheet or glass if clarity is not required for the laminate.

Preferably, the rigid sheet is glass. The term "glass" is meant to include not only window glass, plate glass, silicate glass, sheet glass, and float glass, but also includes colored glass, specialty glass which includes ingredients to control solar heating, glass coated with sputtered metals such as silver or indium tin oxide for solar control purposes, E-glass, Toroglass and Solex® glass. Such specialty glasses are disclosed in, for example, U.S. Pat. Nos. 4,615,989, 5,173,212, 5,264,286, 6,150,028, 6,340,646, 6,461,736, and 6,468,934. The type of glass to be selected for a particular laminate depends on the intended use.

The high strength laminates of the present invention may further comprise one or more layers of polymeric film or polymeric sheet to provide added features to the high strength laminates. The difference between a film and a sheet is the thickness, but there is no set industry standard as to when a film becomes a sheet. Herein, a "film" refers to a thickness of about 10 mils, (0.25 mm), or less, and a "sheet" refers to a thickness of greater than about 10 mils, (0.25 mm). Any polymer known may be used as the film or sheet material. Preferably, the polymeric film or sheet is transparent.

Preferred films for use as polymeric film layers are oriented and unoriented polyester films, polycarbonate films, polyurethane films and polyvinyl chloride films. Most preferably, an additional film layer is biaxially oriented poly(ethylene terephthalate).

Bilayer and multilayer film structures may also be utilized as the polymeric film. One advantage to multilayer films is that specific properties can be tailored into the film to solve critical use needs while allowing the more costly ingredients to be relegated to the outer layers where they provide the greater needs. The additional layers may serve as barrier layers, adhesive layers, antiblocking layers, or for other purposes.

Preferably, the additional polymer sheet is composed of a poly(vinyl butyral) composition, an acoustic polyvinyl acetal composition, an acoustic polyvinyl butyral composition, an ethylene vinyl acetate composition, an ethylene copolymer composition which incorporates acid functionality and ionomers derived therefrom, a thermoplastic polyurethane composition, polyvinyl chloride copolymer compositions acoustic compositions, such as the ISD polyacrylate materials and combinations thereof.

The processes to produce the high strength laminates of the present invention may be produced through any known art process. In particular, the laminates invention may be produced through autoclave and non-autoclave processes, as described below.

In a typical autoclave process, a glass sheet, an interlayer comprising a multilayer polymeric laminate of the present invention, and a second glass sheet are laminated together under heat and pressure and a vacuum (for example, in the range of about 27-28 inches (689-711 mm) Hg) to remove air. Preferably, the interlayer is in contact with the tin side of the glass sheets. Preferably, the glass sheets have been washed and dried. A typical glass type is 90 mil thick annealed flat glass. In a typical procedure, the interlayer is positioned between the glass plates to form a glass/interlayer/glass pre-press assembly. The pre-press assembly is placed in a bag capable of sustaining a vacuum ("a vacuum bag"). The air is drawn out of the bag using a vacuum line or other means of pulling a vacuum on the bag. The bag is sealed while maintaining the vacuum. The sealed bag is placed in an autoclave at a temperature of about 130° C. to about 180° C., at a pressure of about 200 psi (15 bars), for from about 10 to about 50 minutes. Preferably the bag is autoclaved at a temperature of from about 120° C. to about 160° C. for 20 minutes to about 45 minutes. More preferably the bag is autoclaved at a temperature of from about 135° C. to about 155° C. for 20 minutes to about 40 minutes. A vacuum ring may be substituted for the vacuum bag. One type of vacuum bag is disclosed within U.S. Pat. No. 3,311,517.

Alternatively, any air trapped within the glass/interlayer/glass pre-press assembly may be removed through a nip roll process. For example, the glass/interlayer/glass pre-press assembly may be heated in an oven at between about 80° C. and about 120° C., preferably between about 90° C. and about 100° C., for about 30 minutes. Thereafter, the heated glass/interlayer/glass pre-press assembly is passed through a set of nip rolls so that the air in the void spaces between the glass and the interlayer may be squeezed out, and the edge of the assembly sealed.

The pre-press assembly may then be placed in an air autoclave where the temperature is raised to between about 120° C. and about 160° C., preferably between about 135° C. and about 160° C., and the pressure to between about 100 psig to about 300 psig, preferably about 200 psig, (14.3 bar). These conditions are maintained for about 15 minutes to about 1 hour, preferably about 20 minutes to about 50 minutes, after which, the air is cooled while no more air is added to the autoclave. After about 20 minutes of cooling, the excess air pressure is vented and the laminates are removed from the autoclave. Essentially any lamination process known within the art may be used with the interlayers of the present invention.

The laminates of the present invention may also be produced through non-autoclave processes. Such non-autoclave processes are disclosed, for example, within U.S. Pat. Nos. 3,234,062, 3,852,136, 4,341,576, 4,385,951, 4,398,979, 5,536,347, 5,853,516, 6,342,116, 5,415,909, US 2004/0182493, EP 1 235 683 B1, WO 91/01880 and WO 03/057478 A1. Generally, said non-autoclave processes include heating the pre-press assembly and the application of vacuum, pressure or both. For example, the pre-press may be successively passed through heating ovens and nip rolls.

Adhesives, primers, and "additional layers" of polymeric sheets and films may be incorporated into the High strength laminates of the present invention.

For architectural uses and for uses in transportation such as automobiles, trucks, and trains, a typical high strength laminate of the present invention has two layers of glass and directly self-adhered to the glass layers is an multilayer polymeric laminate interlayer of the present invention. The high strength laminate has an overall thickness of about 3 mm to about 30 mm. The interlayer typically has a thickness of about 0.38 mm to about 4.6 mm and each glass layer usually is at least 1 mm thick or thicker. The interlayer of the present invention is adhered directly to the glass and an intermediate adhesive layer or coating between the glass and the interlayer is not required.

EXAMPLES AND COMPARATIVE EXPERIMENTS

Standard Lamination Procedure

A pre-press assembly, in which the layers in the laminate are stacked in the desired order, is placed into a vacuum bag and heated at 90° C. to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas, so that the pressure in the autoclave is allowed to decrease. After 20 minutes of cooling, when the air temperature is less than about 50° C., the excess pressure is vented, and the laminate is removed from the autoclave.

Analytical Methods

Modulus

All moduli were determined according to ASTM D 638-03 (2003).

Haze

Haze is the percentage of luminous flux that is scattered at an angle of more than 2.5 degrees from the axis defined by the path of unscattered light traveling through the laminate. Haze was measured using a Hazegard hazemeter, available from BYK-Gardner USA of Columbia, Md., according to ASTM standard NF-54-111, which is in agreement with method A of ASTM standard D1003-61. Haze was measured on the left side of the laminate, the middle of the laminate and the right side of the laminate and these measurements were averaged to provide the average haze at each sheet thickness.

Transmittance

Percent transmittance represents the arithmetic average transmittance between 350 nm to 800 nm from a UV-Vis spectrometer.

Peel Test

Peel testing was performed through the 90 degree peel strength adhesion test method. The laminates were peeled at a 90-degree angle using a Model SP-102B-3M90 SLIP/PEEL Tester (Instrumentors, Inc., Strongsville, Ohio 44149). The laminates were peeled at rates of 5 inches per minute.

Acoustic Loss Factor Determination

The acoustic loss factor was determined from the measurement of the input impedence of a glass beam sample. A glass/multilayer polymeric laminate/glass laminate, (approximately 25 mm by 300 mm) was placed at its center onto an impact button (15 mm diameter), and affixed thereto with a cyanoacrylic glue. The impact button was supported on an impedence head, which was used to inject a measured force into the specimen via the impact button. A white noise type force between 0 and 7000 Hz was used to inject the specimen. The loss factor was then calculated using the formula:

$$\text{Loss Factor} = \Delta f_i / f_{resi}$$

where $\Delta f_i$ was the frequency difference between the frequencies on the resonance curve having an impedance of 3 dB less than the maximum impedance and $f_{resi}$ is the resonant frequency. The specimen was held in an environmental chamber at the desired set temperature before and during the determination. The samples were tested at a temperature of 10° C., 20° C. and 30° C. The impedance head was connected to a dash pot, which was connected to a power amplifier which, in turn, was connected to a noise generator. The impedance was measured by a FFT analyzer/computer set-up. Such methods are summarized, for example, in the ISO 140 test protocol.

Comparative Experiment CE 1

A multilayer polymeric laminate with a "stiff layer-stiff layer-stiff layer" architecture (layers A/B/C) was produced wherein the layers A, B and C were all formed from an ethylene-co-methacrylic acid copolymer which incorporated 19 weight percent methacrylic acid and was neutralized with sodium ions to a level of 37 percent.

The A layer copolymer was fed into a 1.0-inch diameter (L/D=24) Killion extruder (Extruder A) with a temperature profile:

| Extruder Zone | Temperature (° C.) |
|---|---|
| Feed | Ambient |
| Zone 1 | 180 |
| Zone 2 | 205 |
| Zone 3 | 210 |

The B layer copolymer was fed into a 1.5-inch diameter (L/D =24) Killion extruder (Extruder B) with a temperature profile:

| Extruder Zone | Temperature (° C.) |
|---|---|
| Feed | Ambient |
| Zone 1 | 170 |
| Zone 2 | 180 |
| Zone 3 | 206 |
| Block | 210 |
| Die | 210 |

The C layer copolymer was fed into a 1.25-inch diameter (L/D =24) Killion extruder (Extruder C) with a temperature profile:

| Extruder Zone | Temperature (° C.) |
|---|---|
| Feed | Ambient |
| Zone 1 | 170 |
| Zone 2 | 180 |
| Zone 3 | 205 |

Extruder A throughput was controlled by adjusting the screw speed to 15.2 rpm. Extruder B throughput was controlled by adjusting the screw speed to 70.6 rpm. Extruder C throughput was controlled by adjusting the screw speed to 10.8 rpm. The extruders fed a 14-inch "coathanger" coextrusion die with a nominal gap of 0.038-inch. The as-cast multilayer polymeric laminate was fed into a three roll stack consisting of a 6-inch diameter rubber nip roll covered with a Teflon® release film and two 12-inch diameter polished chrome chill rolls held at a temperature of ~20° C. multilayer polymeric laminate. The nominally 30 mil (0.76 mm) thick A/B/C multilayer polymeric laminate, consisting of a nominally 2.5 mil (0.064 mm) thick A layer, a nominally 25 mil (0.64 mm) thick B layer and a nominally 2.5 mil (0.064 mm) thick C layer, was then wound onto cardboard cores at a rate of 4.6 feet/minute.

The multilayer polymeric laminate was found to have an average haze of 0.78.

Comparative Experiment CE 2

Laminates consisting of a glass layer and the multilayer polymeric laminate produced in Comparative Experiment CE 1 were produced in the following manner. The multilayer polymeric laminate produced in Comparative Experiment CE 1 was conditioned at less than 8 percent relative humidity (RH) at a temperature of 72° F. overnight. A glass/multilayer polymeric laminate/Teflon® film/glass pre-press assembly consisting of, in order, a clear annealed float glass sheet layer, the multilayer polymeric laminate produced in Comparative Experiment CE 1 with the tin side of the glass layer in contact with the multilayer polymeric laminate, a thin Teflon® film layer and a clear annealed float glass layer (each layer measuring 7 inches by 3.5 inches (178 mm by 89 mm); glass layers 2.5 mm thick; multilayer polymeric laminate 30 mils (0.75 mm) thick) was laminated according to the standard lamination procedure. Removal of the Teflon® film and the glass cover sheet provided the desired laminate.

The laminates had a peel adhesion of 3.0 lbs-in.

Comparative Experiment CE 3

Laminates consisting of a glass layer and the multilayer polymeric laminate produced in Comparative Experiment CE 1 were produced using the method described in Comparative Experiment CE 2, with the only difference being that the multilayer polymeric laminate produced in Comparative Experiment CE 1 was conditioned at 23 percent relative humidity (RH) at a temperature of 72° F. overnight before being used in the pre-press assembly.

The laminates had a peel adhesion of 3.9 lbs-in.

Comparative Experiment CE 4

Laminates consisting of a glass layer and the multilayer polymeric laminate produced in Comparative Experiment CE 1 were produced using the method described in Comparative Experiment CE 2, with the only difference being that the multilayer polymeric laminate produced in Comparative Experiment CE 1 was conditioned at 50 percent relative humidity (RH) at a temperature of 72° F. overnight before being used in the pre-press assembly.

The laminates had a peel adhesion of 0.8 lbs-in.

Comparative Experiment CE 5

A laminate consisting of a glass layer, the multilayer polymeric laminate produced in Comparative Experiment CE 1 and a glass layer was produced in the following manner. The multilayer polymeric laminate produced in Comparative Experiment CE 1 were conditioned at 23 percent relative humidity (RH) at a temperature of 72° F. overnight. A glass/multilayer polymeric laminate/glass pre-press assembly consisting of, in order, a clear annealed float glass sheet layer, the multilayer polymeric laminate produced in Comparative Experiment CE 1 and a clear annealed float glass layer (each layer measuring 12 inches by 12 inches (305 mm by 305 mm); glass layers 2.15 mm thick; multilayer polymeric laminatey 30 mils (0.75 mm) thick) was laminated according to the standard lamination procedure.

The laminate had an average haze of 0.78 and an 87.4 percent transmittance.

The laminate was cut into laminate strips approximately 25 mm by 277 mm and subjected to the acoustic loss factor determination protocol. The calculated loss factors for various resonant frequencies and the three temperatures are shown in Table I.

TABLE I

| 10° C. | | 20° C. | | 30° C. | |
|---|---|---|---|---|---|
| Frequency (Hz) | Loss Factor | Frequency (Hz) | Loss Factor | Frequency (Hz) | Loss Factor |
| 213 | 0.0612 | 213 | 0.0636 | 211 | 0.0699 |
| 1232 | 0.0104 | 1223 | 0.0108 | 1210 | 0.0129 |
| 3110 | 0.0125 | 3072 | 0.0117 | 3024 | 0.0140 |
| 5465 | 0.0140 | 5384 | 0.0139 | 5283 | 0.0195 |

Comparative Experiment CE 6

A multilayer polymeric laminate with a "stiff layer-stiff layer-stiff layer" architecture (layers A/B/C) was produced using the method described in Comparative Experiment 1 with the following differences. Layer A was formed from an ethylene-co-methacrylic acid-co-maleic acid monomethylester terpolymer which incorporated 11 weight percent methacrylic acid and 6 weight percent maleic acid monomethylester which was neutralized with a mixture of sodium and zinc ions to a level of 40 percent based on the total level of acid functionalities. Layer B was formed from an ethylene-co-methacrylic acid copolymer which incorporated 19 weight percent methacrylic acid which was neutralized with sodium ions to a level of 37 percent. Layer C was formed from a terpolymer essentially the same as that utilized for layer A. Extruder A throughput was controlled by adjusting the screw speed to 70.0 rpm. Extruder B throughput was controlled by adjusting the screw speed to 13.4 rpm. Extruder C throughput was controlled by adjusting the screw speed to 14.6 rpm. After passing through the three roll stack, the multilayer polymeric laminate was wound onto cardboard cores at a rate of 4.5 feet/minute.

Comparative Experiment CE 7

Laminates consisting of a glass layer and the multilayer polymeric laminate produced in Comparative Experiment CE 6 were produced using the method described in Comparative Experiment 2.

The laminates had a peel adhesion of 1.3 lbs-in.

Comparative Experiment CE 8

Laminates consisting of a glass layer and the multilayer polymeric laminate produced in Comparative Experiment CE 6 were produced using the method described in Comparative Experiment 3.

The laminates had a peel adhesion of 1.2 lbs-in.

Comparative Experiment CE 9

Laminates consisting of a glass layer and the multilayer polymeric laminate produced in Comparative Experiment CE 6 were produced using the method described in Comparative Experiment 4. The laminates had a peel adhesion of 0.6 lbs-in.

Comparative Experiment CE 10

A laminate consisting of a glass layer, the multilayer polymeric laminate produced in Comparative Experiment CE 6 and a glass layer was produced using the method described in Comparative Experiment CE 5.

The laminate had an 84.9 percent transmittance.

The laminate was cut into laminate strips approximately 25 mm by 277 mm and subjected to the acoustic loss factor determination protocol. The calculated loss factors for various resonant frequencies and the three temperatures are shown in Table II.

TABLE II

| 10° C. | | 20° C. | | 30° C. | |
|---|---|---|---|---|---|
| Frequency (Hz) | Loss Factor | Frequency (Hz) | Loss Factor | Frequency (Hz) | Loss Factor |
| 202 | 0.0639 | 201 | 0.0592 | 201 | 0.0561 |
| 1192 | 0.0106 | 1184 | 0.0108 | 1174 | 0.0130 |
| 3051 | 0.0108 | 3019 | 0.0123 | 2975 | 0.0143 |
| 5414 | 0.0145 | 5338 | 0.0151 | 5241 | 0.0184 |

Comparative Experiment 11

A multilayer polymeric laminate with a "soft layer-stiff layer-soft layer" architecture (layers A/B/C) was produced using the method described in Comparative Experiment 1 with the following differences. Layer A was formed from an ethylene-co-methacrylic acid-co-n-butyl acrylate terpolymer which incorporated 9.6 weight percent methacrylic acid and 23.5 weight percent n-butyl acrylate which was neutralized with sodium ions to a level of 52 percent. Layer B was formed from an ethylene-co-methacrylic acid copolymer which incorporated 19 weight percent methacrylic acid which was neutralized with sodium ions to a level of 37 percent. Layer C was formed from a terpolymer essentially the same as that utilized for layer A. Extruder A throughput was controlled by adjusting the screw speed to 70.5 rpm. Extruder B throughput was controlled by adjusting the screw speed to 14.5 rpm. Extruder C throughput was controlled by adjusting the screw speed to 15.1 rpm. After passing through the three roll stack, the multilayer polymeric laminate was wound onto cardboard cores at a rate of 4.5 feet/minute.

Comparative Experiment 12

Laminates consisting of a glass layer and the multilayer polymeric laminate produced in Comparative Experiment CE 11 were produced using the method described in Comparative Experiment 2.

The laminates had a peel adhesion of 18.5 lbs-in.

Comparative Experiment CE 13

Laminates consisting of a glass layer and the multilayer polymeric laminate produced in Comparative Experiment CE 11 were produced using the method described in Comparative Experiment 3.

The laminates had a peel adhesion of 9.5 lbs-in.

Comparative Experiment CE 14

Laminates consisting of a glass layer and the multilayer polymeric laminate produced in Comparative Experiment CE 11 were produced using the method described in Comparative Experiment 4.

The laminates had a peel adhesion of 8.6 lbs-in.

Comparative Experiment CE 15

A laminate consisting of a glass layer, the multilayer polymeric laminate produced in Comparative Experiment CE 11 and a glass layer was produced using the method described in Comparative Experiment CE 5.

The laminate had an average haze of 0.87 and an 84.1 percent transmittance.

The laminate was cut into laminate strips approximately 25 mm by 277 mm and subjected to the acoustic loss factor determination protocol. The calculated loss factors for various resonant frequencies and the three temperatures are shown in Table III.

TABLE III

| 10° C. | | 20° C. | | 30° C. | |
| --- | --- | --- | --- | --- | --- |
| Frequency (Hz) | Loss Factor | Frequency (Hz) | Loss Factor | Frequency (Hz) | Loss Factor |
| 199 | 0.0516 | 199 | 0.0571 | 195 | 0.0706 |
| 1157 | 0.0248 | 1123 | 0.0334 | 1076 | 0.0463 |
| 2923 | 0.0397 | 2794 | 0.0515 | 2627 | 0.0654 |
| 5144 | 0.0534 | 4865 | 0.0647 | 4550 | 0.0757 |

TABLE IV

| 10° C. | | 20° C. | | 30° C. | |
| --- | --- | --- | --- | --- | --- |
| Frequency (Hz) | Loss Factor | Frequency (Hz) | Loss Factor | Frequency (Hz) | Loss Factor |
| 201 | 0.0637 | 196 | 0.0762 | 186 | 0.0824 |
| 1054 | 0.0741 | 973 | 0.0828 | 885 | 0.0928 |
| 2536 | 0.0973 | 2314 | 0.1010 | 2097 | 0.1011 |
| 4384 | 0.1091 | 3992 | 0.1065 | 3654 | 0.0940 |
| 6568 | 0.1075 | 6048 | 0.1016 | 5620 | 0.0838 |

Example 1

A multilayer polymeric laminate with a "stiff layer-soft layer-stiff layer" architecture (layers A/B/C) was produced using the method described in Comparative Experiment 1 with the following differences. Layer A was formed from an ethylene-co-methacrylic acid copolymer which incorporated 19 weight percent methacrylic acid which was neutralized with sodium ions to a level of 37 percent. Layer B was formed from an ethylene-co-methacrylic acid-co-n-butyl acrylate terpolymer which incorporated 9.6 weight percent methacrylic acid and 23.5 weight percent n-butyl acrylate which was neutralized with sodium ions to a level of 52 percent. Layer C was formed from a copolymer essentially the same as that utilized for layer A. Extruder A throughput was controlled by adjusting the screw speed to 70.6 rpm. Extruder B throughput was controlled by adjusting the screw speed to 15.4 rpm. Extruder C throughput was controlled by adjusting the screw speed to 14.3 rpm. After passing through the three roll stack, the multilayer polymeric laminate was wound onto cardboard cores at a rate of 4.2 feet/minute.

Example 2

Laminates consisting of a glass layer and the multilayer polymeric laminate produced in Example 1 were produced using the method described in Comparative Experiment 2.
The laminates had a peel adhesion of 10.8 lbs-in.

Example 3

Laminates consisting of a glass layer and the multilayer polymeric laminate produced in Example 1 were produced using the method described in Comparative Experiment 3.
The laminates had a peel adhesion of 7.7 lbs-in.

Example 4

Laminates consisting of a glass layer and the multilayer polymeric laminate produced in Example 1 were produced using the method described in Comparative Experiment 4.
The laminates had a peel adhesion of 6.5 lbs-in.

Example 5

A laminate consisting of a glass layer, the multilayer polymeric laminate produced in Example 1 and a glass layer was produced using the method described in Comparative Experiment CE 5.
The laminate had an 84.5 percent transmittance.
The laminate was cut into laminate strips approximately 25 mm by 277 mm and subjected to the acoustic loss factor determination protocol. The calculated loss factors for various resonant frequencies and the three temperatures are shown in Table IV.

Comparison of the acoustic loss measurements for Comparative Experiments CE 5, 10 and 15 with those for this Example show that the acoustic properties of the glass/multilayer polymeric laminate/glass laminates depend greatly on the architecture of the multilayer polymeric laminate. In Comparative Experiments CE 5 and 10 a "stiff layer-stiff layer-stiff layer" architecture resulted in low loss at high frequencies. In Comparative Experiments CE 15, a "soft layer-stiff layer-soft layer" architecture resulted in intermediate loss at all frequencies at high frequencies. However, the "stiff layer-soft layer-stiff layer" architecture of the invention used in this Example resulted in high loss at high frequencies and therefore provides better acoustic barrier properties than the "stiff layer-stiff layer-stiff layer" and "soft layer-stiff layer-soft layer" architectures.

What is claimed is:
1. A high strength safety glass laminate consisting essentially of two rigid sheets of glass and a multilayer polymeric laminate,
wherein the multilayer polymeric laminate consisting essentially of three layers of ionomeric materials laminated such that the two outer layers of the multilayer polymeric laminate are on either side of the inner layer,
wherein each of the ionomeric materials independently comprise a copolymer of an alpha olefin and an alpha, beta-ethylenically unsaturated carboxylic acid partially neutralized with metal ions,
wherein the inner layer of ionomeric material has a modulus (as measured in accordance with ASTM D 638-03 (2003)) of from about 3,000 psi to about 10,000 psi and the two outer layers of ionomeric materials each has a modulus (as measured in accordance with ASTM D 638-03 (2003)) of from about 30,000 psi to about 80,000 psi,
wherein the inner layer of ionomeric material has a thickness of about 20 mils or greater,
wherein each of the two outer layers of ionomeric materials has a thickness of at least about 1 mil or greater,
wherein the total thickness of the multilayer polymeric laminate is from about 60 mils to about 250 mils,
wherein the two rigid sheets are positioned on opposite sides of the multilayer polymeric laminate, and
wherein the inner layer of ionomeric material contains an unsaturated comonomer selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetate, vinyl propionate and mixtures thereof.

2. The high strength safety glass laminate of claim 1, wherein the total thickness of the multilayer polymeric laminate is from about 60 mils to about 120 mils.

3. The high strength laminate of claim 1, wherein the two outer layers of ionomeric materials each has a modulus (as measured in accordance with ASTM D 638-03 (2003)) of from about 50,000 psi to about 75,000 psi.

4. The high strength safety glass laminate of claim 1, wherein each copolymer of the alpha olefin and the alpha, beta-ethylenically unsaturated carboxylic acid independently incorporates from about 0.1 to about 30 weight percent of the alpha, beta-ethylenically unsaturated carboxylic acid component and wherein each of the ionomeric materials are independently neutralized from about 15 to about 50 percent with metal ions based on the total carboxylic acid content.

5. The high strength safety glass laminate of claim 4, wherein the metal ions are selected from the group consisting of sodium, zinc and mixtures thereof.

6. The high strength safety glass laminate of claim 2, wherein the two outer layers of ionomeric materials each has a modulus (as measured in accordance with ASTM D 638-03 (2003)) of from about 50,000 psi to about 75,000 psi.

7. The high strength safety glass laminate of claim 3, wherein each copolymer of the alpha olefin and the alpha, beta-ethylenically unsaturated carboxylic acid independently incorporates from about 0.1 to about 30 weight percent of the alpha, beta-ethylenically unsaturated carboxylic acid component and wherein each of the ionomeric materials are independently neutralized from about 15 to about 50 per cent with metal ions based on the total carboxylic acid content.

8. The high strength safety glass laminate of claim 7, wherein the metal ions are selected from the group consisting of sodium, zinc and mixtures thereof.

9. The high strength safety glass laminate of claim 7, wherein the unsaturated comonomer is selected from the group consisting of methyl acrylate, methyl methacrylate, ethyl acrylate, ethyl methacrylate, butyl acrylate, butyl methacrylate, iso-butyl acrylate, iso-butyl methacrylate, glycidyl methacrylate, vinyl acetate and mixtures thereof.

10. The high strength safety glass laminate of claim 9, wherein the metal ions are selected from the group consisting of sodium, zinc and mixtures thereof.

11. The high strength safety glass laminate of claim 10, wherein the total thickness of the multilayer polymeric laminate is from about 60 mils to about 120 mils.

12. A high strength safety glass laminate consisting essentially of two rigid sheets of glass, a polymer film or sheet, and a multilayer polymeric laminate,
wherein the multilayer polymeric laminate consists essentially of three layers of ionomeric materials laminated such that the two outer layers of the multilayer polymeric laminate are on either side of the inner layer,
wherein each of the ionomeric materials independently comprise a copolymer of an alpha olefin and an alpha, beta-ethylenically unsaturated carboxylic acid partially neutralized with metal ions,
wherein the inner layer of ionomeric material has a modulus (as measured in accordance with ASTM D 638-03 (2003)) of from about 3,000 psi to about 10,000 psi and the two outer layers of ionomeric materials each has a modulus (as measured in accordance with ASTM D 638-03 (2003)) of from about 30,000 psi to about 80,000 psi,
wherein the inner layer of ionomeric material has a thickness of about 20 mils or greater,
wherein each of the two outer layers of ionomeric materials has a thickness of at least about 1 mil or greater,
wherein the total thickness of the multilayer polymeric laminate is from about 60 mils to about 250 mils,
wherein the two rigid sheets are positioned on opposite sides of the multilayer polymeric laminate,
wherein the polymer film or sheet is positioned between one of the rigid sheets of glass and the multilayer polymeric laminate, and
wherein the inner layer of ionomeric material contains an unsaturated comonomer selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetate, vinyl propionate and mixtures thereof.

13. The high strength safety glass laminate of claim 12, wherein the unsaturated comonomer is selected from the group consisting of methyl acrylate, methyl methacrylate, ethyl acrylate, ethyl methacrylate, butyl acrylate, butyl methacrylate, iso-butyl acrylate, iso-butyl methacrylate, glycidyl methacrylate, vinyl acetate and mixtures thereof.

14. The high strength safety glass laminate of claim 13, wherein each of the ionomeric materials are independently neutralized from about 15 to about 50 per cent with metal ions based on the total carboxylic acid content and wherein the metal ions are selected from the group consisting of sodium, zinc and mixtures thereof.

15. The high strength safety glass laminate of claim 12, wherein the total thickness of the multilayer polymeric laminate is from about 60 mils to about 120 mils.

16. The high strength safety glass laminate of claim 14, wherein the total thickness of the multilayer polymeric laminate is from about 60 mils to about 120 mils.

17. A high strength safety glass laminate having improved acoustic barrier properties consisting of two rigid sheets of glass and multilayer polymeric laminate,
- wherein the multilayer polymeric laminate consists of three layers of ionomeric materials laminated such that the two outer layers are on either side of the inner layer,
- wherein each of the ionomeric materials independently comprise a copolymer of an alpha olefin and an alpha, beta-ethylenically unsaturated carboxylic acid partially neutralized with metal ions,
- wherein the inner layer of ionomeric material has a modulus (as measured in accordance with ASTM D 638-03 (2003)) of from about 3,000 psi to about 10,000 psi,
- wherein the inner layer of ionomeric material has a thickness of about 20 mils or greater,
- wherein the two outer layers of ionomeric materials each has a modulus (as measured in accordance with ASTM D 638-03 (2003)) of from about 30,000 psi to about 80,000 psi,
- wherein each of the two outer layers of ionomeric materials has a thickness of at least about 1 mil or greater,
- wherein the total thickness of the multilayer polymeric laminate is from about 60 mils to about 250 mils,
- wherein each copolymer of the alpha olefin and the alpha, beta-ethylenically unsaturated carboxylic acid independently incorporates from about 0.1 to about 30 weight percent of the alpha, beta-ethylenically unsaturated carboxylic acid component,
- wherein each of the ionomeric materials are independently neutralized from about 5 to about 100 percent with metal ions based on the total carboxylic acid content, and
- wherein the inner layer of ionomeric material contains an unsaturated comonomer selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetate, vinyl propionate and mixtures thereof.

18. The high strength safety glass laminate of claim 17, wherein the unsaturated comonomer is selected from the group consisting of methyl acrylate, methyl methacrylate, ethyl acrylate, ethyl methacrylate, butyl acrylate, butyl methacrylate, iso-butyl acrylate, iso-butyl methacrylate, glycidyl methacrylate, vinyl acetate and mixtures thereof.

19. The high strength safety glass laminate of claim 18, wherein the metal ions are selected from the group consisting of sodium, zinc and mixtures thereof.

20. The high strength safety glass laminate of claim 17, wherein the total thickness of the multilayer polymeric laminate is from about 60 mils to about 120 mils.

21. The high strength safety glass laminate of claim 19, wherein each of the ionomeric materials are independently neutralized from about 15 to about 50 per cent with metal ions based on the total carboxylic acid content and the total thickness of the multilayer polymeric laminate is from about 60 mils to about 120 mils.

* * * * *